(12) United States Patent
Vagnoli

(10) Patent No.: US 7,264,864 B2
(45) Date of Patent: *Sep. 4, 2007

(54) TILES AND METHOD OF MAKING SAME

(76) Inventor: Ivano Vagnoli, Via Gramsci, 297, I-56024 Ponte a Bgola, S. Miniato (PI) (IT)

(*) Notice: Subject to any disclaimer, the term of this patent is extended or adjusted under 35 U.S.C. 154(b) by 164 days.

This patent is subject to a terminal disclaimer.

(21) Appl. No.: 10/705,335

(22) Filed: Nov. 10, 2003

(65) Prior Publication Data

US 2004/0135284 A1    Jul. 15, 2004

(30) Foreign Application Priority Data

Nov. 8, 2002    (EP) .................................. 02425684

(51) Int. Cl.
*B32B 3/24*    (2006.01)

(52) U.S. Cl. ...................... 428/137; 428/131; 428/139; 428/140; 428/904; 165/53; 237/69

(58) Field of Classification Search ................ 428/131, 428/137, 139, 140, 904; 237/69; 165/53
See application file for complete search history.

(56) References Cited

U.S. PATENT DOCUMENTS

| 4,101,689 | A | | 7/1978 | Wienand et al. |
| 4,849,145 | A | | 7/1989 | Hirsch |
| 4,864,790 | A | * | 9/1989 | Liardet ...................... 52/311.2 |
| 5,567,497 | A | * | 10/1996 | Zegler et al. .................. 428/95 |

FOREIGN PATENT DOCUMENTS

| DE | 17 04 247 A | 5/1971 |
| EP | 0 281 419 A | 9/1988 |

* cited by examiner

*Primary Examiner*—William P. Watkins, III
(74) *Attorney, Agent, or Firm*—Jason A. Bernstein; Powell Goldstein LLP

(57) ABSTRACT

A tile, made for example of leather, having a first face, a second face, side edges and a plurality of holes that bring into communication first face with second face. In a lining made with such tiles like this, the holes lead the air from below to above the tiles. To improve further the air flow through the tile, on the second face a plurality of grooves are made that extend from a central zone up to the side edges of the tile. This way, an air path is formed between the lining and the floor leading the air to holes and then into the room at the side of first face. A favorable exchange rate through a floor lining made with them is obtained, combined with a heat exchanger embedded in the floor.

4 Claims, 5 Drawing Sheets

TILES AND METHOD OF MAKING SAME

FIELD OF THE INVENTION

The present invention relates to the building industry and more precisely it relates to a method for making lining elements, for example tiles, skirting boards, etc., for room lining. Furthermore, the invention relates to a tile made with this method. In particular, the invention relates to a leather lining element.

BACKGROUND OF THE INVENTION

Floor lining elements are known that cover heat exchangers embedded in the floor. This way, the heat flows towards the above through the lining and then is exchanged with the air in the room. The heat through the lining, however, is not exchanged by air convection and this reduces the exchange rate.

If the files we made of leather reinforced with plastic resin, as described in a co-pending application filed on the saint day as the present application entitled, "METHOD FOR MAKING LEATHER TILES AND TILES THUS OBTAINED"U.S. patent application Ser. No. 10/705.256) the disclosure of which is incorporated herein by the same applicant, the insulation offered is very high and then such a type of heating system is not preferred.

SUMMARY OF THE INVENTION

It is therefore a feature of the present invention to provide a method for making tiles that allow air convection through a lining made with them.

It is a particular a feature of the present invention to provide a method for making tiles so that a maximum exchange rate through a floor lining made with them is obtained.

It is a further feature of the present invention to provide tiles, in particular but not exclusively a leather tiles, obtained with this method and that have the same advantages.

These and other features are exemplified by a method for making tiles for room lining, according to the present invention, comprising the steps of preparing a semifinished tile having a first face and a second face; and making a plurality of holes for connecting said first face and said second face.

Advantageously, the second face of the semifinished tile is made with at least one shallow groove forming a channel of communication between the side edges of the tile and said holes. This way, between the lining and the floor an air path is formed leading the air to the holes and then into the room on the side of the first face.

Advantageously, the holes are made creating an array of small holes at moulding the tile. Preferably, the tiles are made of leather. In this case, before making said holes the further steps are provided of: (a) introducing a semifinished leather tile in a plastic resin injection mould with the first face oriented towards below; (b) introducing the plastic resin in the mould, the resin filling the remaining free space; and (c) hardening the plastic resin that becomes integral to the semifinished leather tile. In this case after making said holes, these bring into communication the first face of the semifinished leather tile to the lower face of the layer of hardened resin.

Alternatively, the step of making a layer of plastic resin on the second face of the semifinished leather tile can be carried out after the step of making a plurality of holes, whereby when introducing the resin in the mould the resin fills also the space where the holes are made. In this case, a piercing step follows by means of, for example, mechanical needles, laser, etc., for connecting the first face of the semifinished leather tile to the lower face of the layer of hardened resin.

Advantageously, the holes are made at a portion of hardened resin visible on the first face and hardened within at least one aperture made previously in said semifinished leather tile.

According to another aspect of the invention a leather tile for room lining, according to the present invention, has a first face, a second face and a plurality of holes suitable for connecting said first face and said second face.

Advantageously, the second face of the leather tile preferably has furthermore at least one shallow groove suitable for connecting the side edge of the tile with the portion where the holes are made.

Advantageously, the tile can be obtained by a layer of plastic resin that becomes integral to a second face of a semifinished leather tile. In this case the holes bring into communication the first face of the semifinished leather tile to the lower face of the layer of resin.

In an alternative embodiment, a portion of the layer of plastic resin fills at least one aperture of the semifinished leather tile. In this case, the leather tile has at least one hole at the portion of hardened resin visible on the first face.

In particular, the hardened resin may have a side portion exceeding the second face of the semifinished leather tile, thus creating an exterior edge that surrounds the leather.

BRIEF DESCRIPTION OF THE DRAWINGS

Further characteristics and the advantages of the method according to the invention for making tiles for room lining will be made clearer with the following description of an exemplary embodiment thereof, exemplifying but not limitative, with reference to the attached drawings, wherein.

In the figures the holes of the tiles are oversized for the purpose of showing them better.

DESCRIPTION OF THE INVENTION

Figure 1:
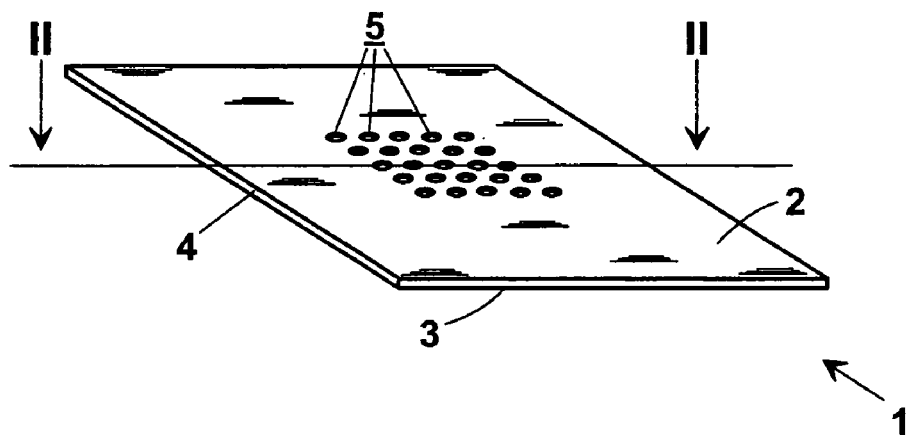
FIG. 1 shows a perspective top plan view of an exemplary embodiment of a leather tile with aperture, according to the invention.
Figure 2:
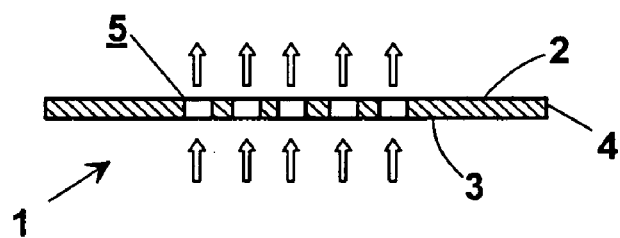
FIG. 2 is a cross sectional view according to arrows II-II of the tile of FIG. 1.

With reference to FIGS. 1 and 2, in one exemplary of the invention a tile 1, made for example of leather, has a first face 2, a second face 3, side edges 4 and a plurality of holes 5 that bring into communication first face 2 with second face 3. therefore, holes 5 lead the air from below to above tile 1.

Figure 3:
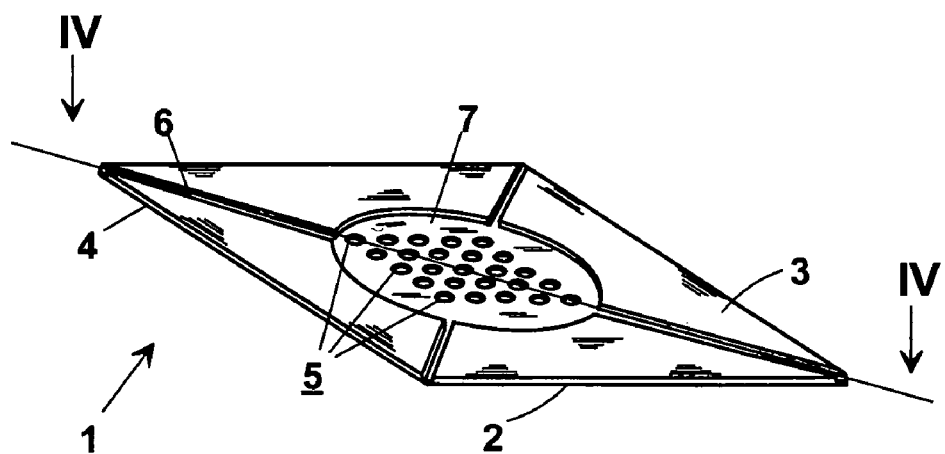
FIG. 3 shows a perspective view from below of a tile according to an alternative embodiment.
Figure 4:
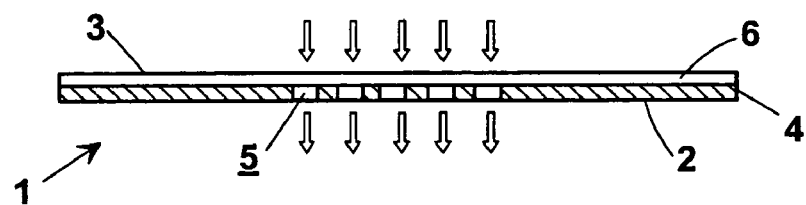
FIG. 4 shows a cross sectional view according to arrows IV-IV of the tile of FIG. 3.
Figure 5:
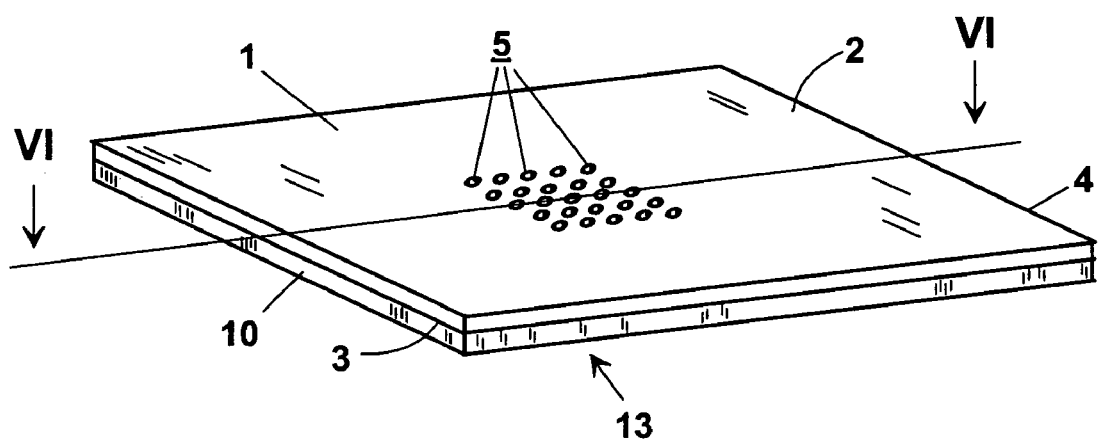
FIG. 5 shows a perspective top plan view of a another exemplary embodiment of the tile of FIG. 1, i.e., equipped with a plastic resin layer fixed to the semifinished leather tile.

To improve further the air flow through tile 1, on second face 3 a plurality of grooves 6 are made that extend from a central zone 7 up to the side edges 4 of tile 1, as shown in FIGS. 3 and 4. This way, between lining 1 and the floor an air path is formed leading the air to holes 5 and then into the room at the side of first face 2.

Figure 6:
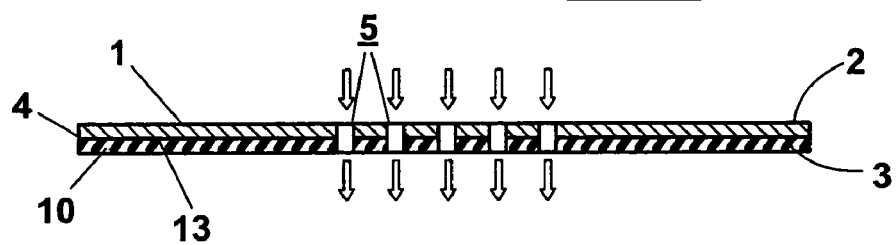
FIG. 6 shows a cross sectional view according to arrows VI-VI of the tile of FIG. 5.
Figure 7:
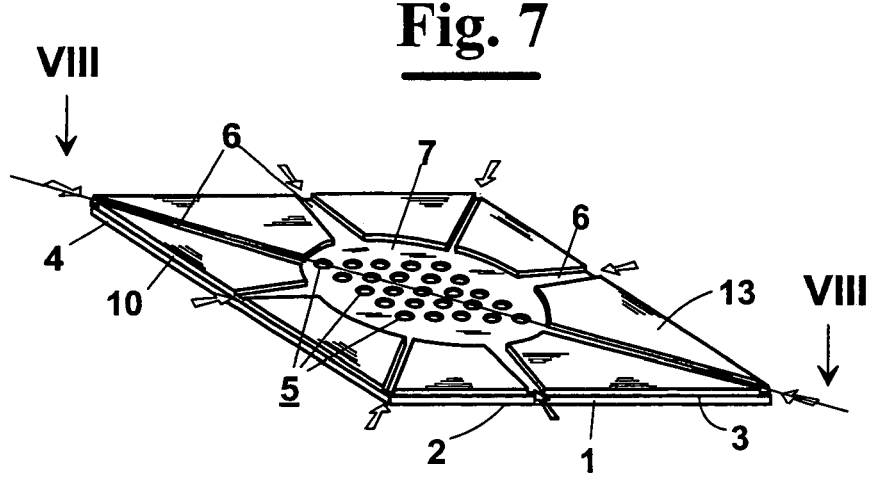
FIG. 7 shows a perspective view from below of an alternative exemplary embodiment of the tile with plastic resin injection.
Figure 8:
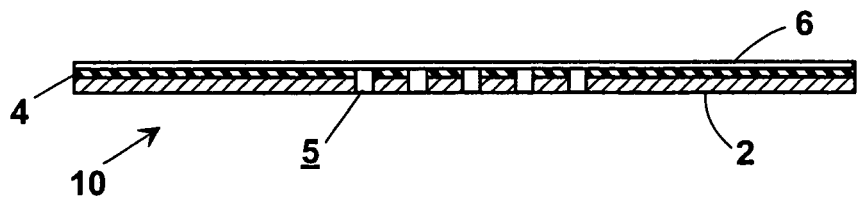
FIG. 8 shows a cross sectional view according to arrows VIII-VIII of the tile of FIG. 7.
Figure 9:
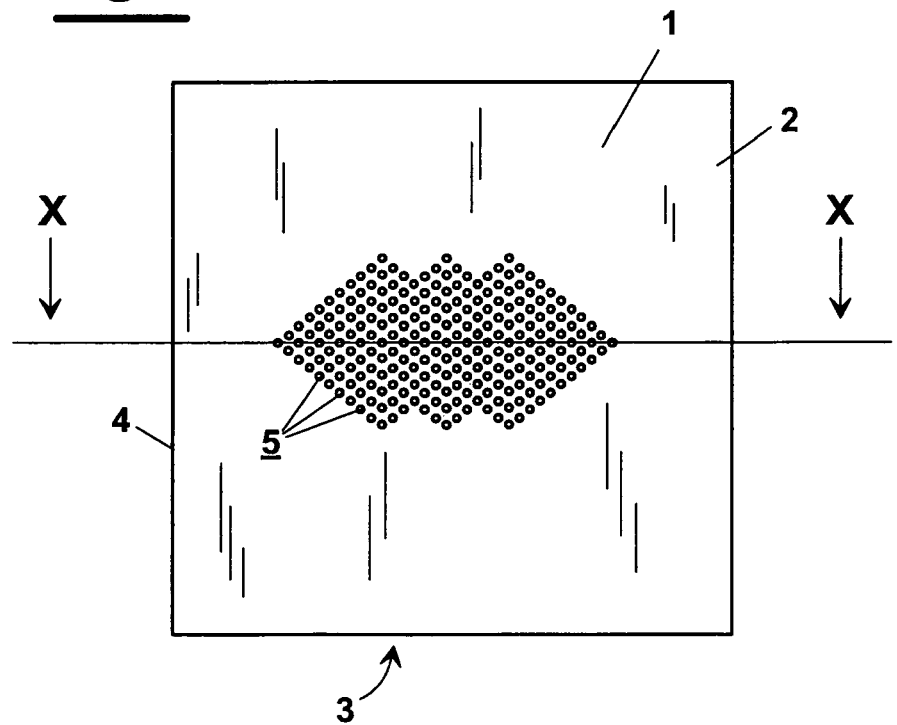
FIG. 9 shows a top plan view according to arrows X-X of a tile with small holes.
Figure 10:
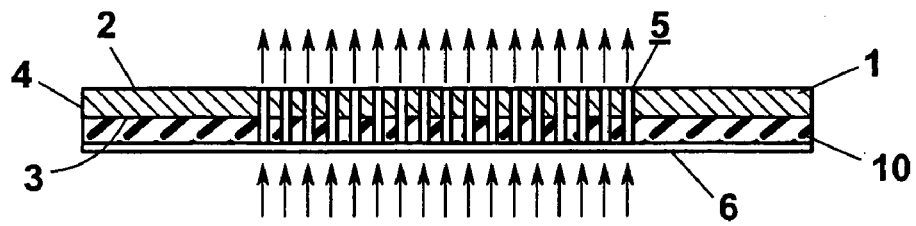
FIG. 10 shows a cross sectional view according to arrows X-X of a tile with small holes.

An alternative exemplary embodiment of tile 1 is shown in FIGS. from 5-8. In particular, it has a layer of plastic resin 10 steadily fixed to the second face 2 of semifinished leather tile 1. The layer of resin 10 can be made, for example, putting semifinished leather tile 1 in an injection mould not shown with first face 2 oriented towards below. Then, in the mould plastic resin is injected that fills the remaining free space and becomes integral to second face 3 of semifinished leather tile 1. In this case, the holes 5 bring into communication first face 2 of semifinished leather tile 1 with lower surface 13 of the layer of resin 10, as shown in detail in FIGS. 6 and 8 in a cross sectional view. The lower face 13 of the layer of resin 10 can have, like in the previous case, a plurality of channels 6 for leading the air flow towards holes 5 (FIGS. 7 and 8). As shown in FIGS. 9 and 10, by piercing through mechanical needles, laser, etc., holes 5 may have very small size.

Figure 11:
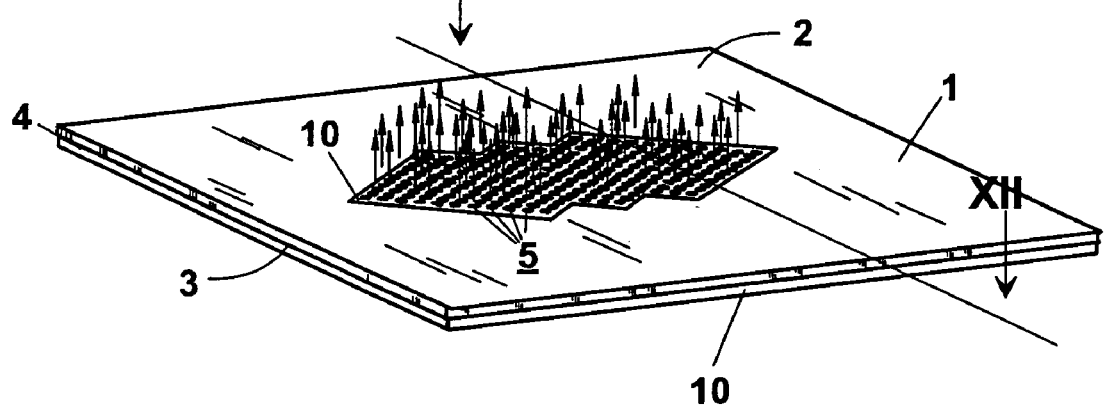
FIG. 11 shows a perspective view according to arrows XII-XII of a further alternative embodiment of the leather tile of FIG. 1.
Figure 12:
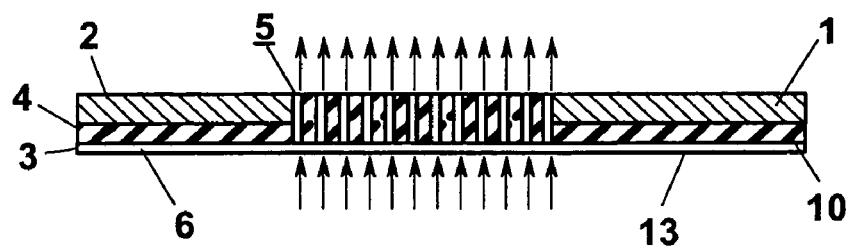
FIG. 12 shows a cross sectional view according to arrows XII-XII of a further alternative embodiment of the leather tile of FIG. 1.

A further exemplary provides that the step of making a layer of plastic resin 10 on second face 3 of semifinished leather tile 1 is made through making a first series of holes 5 (FIGS. 11 and 12). At injecting the resin in the mould it fills also the space within holes 5 up to first face 2 of semifinished leather tile 1, as shown in the cross section of FIG. 12. Then, a further piercing step follows for connecting first face 2 of semifinished leather tile 1 with lower face 13 of the layer of hardened resin 10, obtaining a further exemplary embodiment of tile 1.

Figure 13:
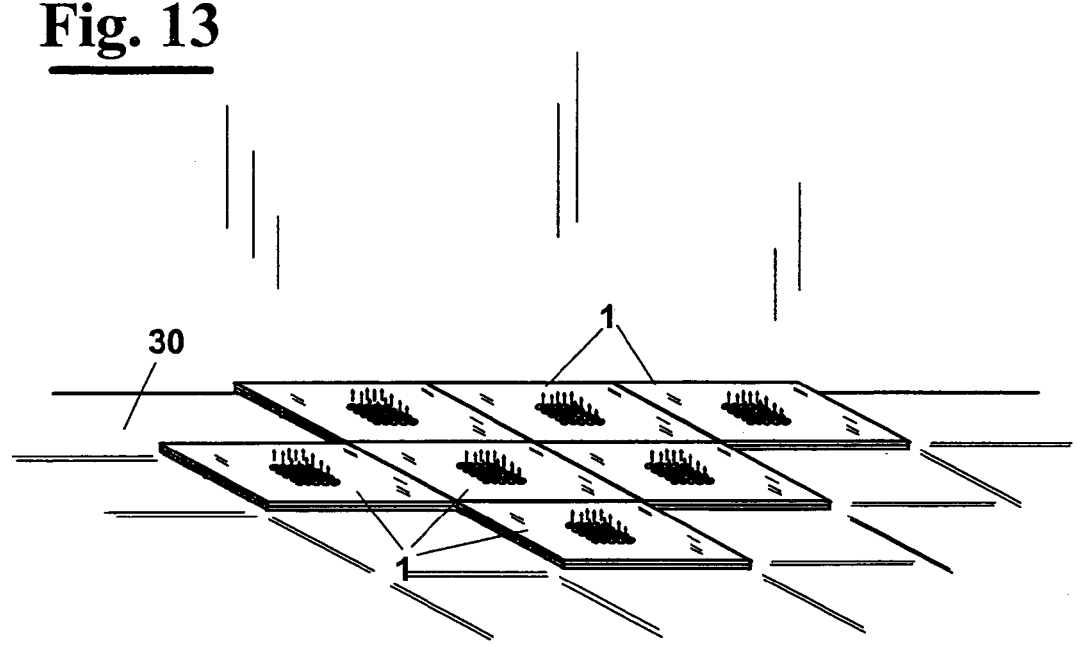
FIG. 13 shows a perspective view of a floor lined with leather tiles according to the present invention.
Figure 14:
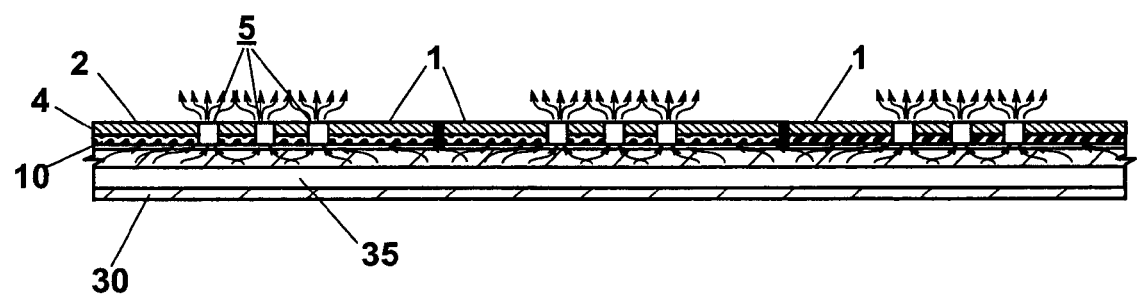
FIG. 14 shows a cross sectional view of a floor lined with leather tiles according to the present invention.

As shown in FIGS. 13 and 14, tile 1 leads warm air heated by an embedded exchanger 35 to flow out the holes into the room.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

What is claimed:

1. A leather tile for room lining for use in a heated floor system, comprising: a semi-finished leather tile having a first face, a second face and at least one through aperture between said faces, wherein a layer of plastic resin is provided that becomes integral to said second face, said layer of plastic resin having a lower face, and having a plurality of holes suitable for connecting said first face and said lower face, in order to conduct air from said lower face to said first face, wherein said plastic resin fills said aperture and said holes are made through said layer of plastic resin filling said aperture.

2. The leather tile of claim 1, wherein said lower face comprises at least one shallow groove suitable for connecting the side edge of said leather tile with the portion where said holes are made.

3. The leather tile of claim 1, wherein said layer of plastic resin has a side portion exceeding said second face of the semifinished leather tile, forming an exerior edge that surrounds the leather.

4. The leather tile of claim 1, wherein said hardening resin has a side portion exceeding said second face of said semifinished leather tile forming an exterior edge that surrounds said leather.

* * * * *